United States Patent
Dong et al.

(10) Patent No.: US 10,485,035 B2
(45) Date of Patent: Nov. 19, 2019

(54) ADAPTIVE PEER STATUS CHECK OVER WIRELESS LOCAL AREA NETWORKS

(71) Applicant: TELEFONAKTIEBOLAGET LM ERICSSON (PUBL), Stockholm (SE)

(72) Inventors: Jichun Dong, Shenzhen (CN); Jinyan Liu, Shenzhen (CN); Wei Xu, Shenzhen (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/560,427

(22) PCT Filed: Apr. 28, 2015

(86) PCT No.: PCT/CN2015/077646
§ 371 (c)(1),
(2) Date: Sep. 21, 2017

(87) PCT Pub. No.: WO2016/172839
PCT Pub. Date: Nov. 3, 2016

(65) Prior Publication Data
US 2018/0092140 A1    Mar. 29, 2018

(51) Int. Cl.
*H04W 76/12* (2018.01)
*H04W 76/38* (2018.01)
(Continued)

(52) U.S. Cl.
CPC ......... *H04W 76/12* (2018.02); *H04W 76/22* (2018.02); *H04W 76/25* (2018.02); *H04W 76/38* (2018.02); *H04W 84/12* (2013.01)

(58) Field of Classification Search
CPC ......... H04L 12/28; H04L 29/06; H04L 63/08; H04L 63/164
See application file for complete search history.

(56) References Cited

U.S. PATENT DOCUMENTS

| | | | |
|---|---|---|---|
| 9,241,034 B2* | 1/2016 | Wu | ............... H04L 67/104 |
| 2003/0081607 A1* | 5/2003 | Kavanagh | ........ H04L 63/0227 370/392 |

(Continued)

FOREIGN PATENT DOCUMENTS

| WO | 2014/048197 A1 | 4/2014 |
|---|---|---|
| WO | 2014/066393 A1 | 5/2014 |

OTHER PUBLICATIONS

G. Huang et al.: "A Traffic-Based Method of Detecting Dead Internet Key Exchange (IKE) Peers"; Cisco Systems Inc., Feb. 2004; 13 pages.

(Continued)

Primary Examiner — Melanie Jagannathan
(74) Attorney, Agent, or Firm — Ericsson Inc.

(57) ABSTRACT

Embodiments of the invention relate to methods and apparatus for adapting the IKE/IPsec peer status time interval in accordance with the service delivered to the UE. The peer status time interval is used to detect IKE/IPsec peer liveliness in the UE. The evolved Packet Data Gateway, ePDG, sets the peer status time interval according to the type of bearers or GTP tunnels established with the PDN GW. The ePDG uses a default peer status interval T1 when the ePDG connects the UE to the PDN using the default GTP tunnel established at the time of PDN connection establishment. When a multimedia service is established for the UE, one or more dedicated GTP tunnels of different quality of service requirements may be established at the ePDG. The ePDG would then use a different peer status time interval T2 that may be derived from the quality of service parameters associated with the one or more dedicated GTP tunnels.

19 Claims, 5 Drawing Sheets

(51) Int. Cl.
*H04W 76/22* (2018.01)
*H04W 76/25* (2018.01)
*H04W 84/12* (2009.01)

(56) References Cited

U.S. PATENT DOCUMENTS

| | | | |
|---|---|---|---|
| 2005/0265279 A1* | 12/2005 | Markovic | H04W 76/11 370/328 |
| 2008/0165796 A1 | 7/2008 | Martinez | |
| 2015/0092573 A1 | 4/2015 | Zhang et al. | |
| 2015/0195265 A1* | 7/2015 | Chen | H04L 63/08 726/3 |
| 2015/0382359 A1* | 12/2015 | Huang | H04W 72/1252 370/230 |
| 2016/0021194 A1* | 1/2016 | Prabhakar | H04L 67/143 709/204 |
| 2017/0180189 A1* | 6/2017 | Hosdurg | G06F 11/0709 |

OTHER PUBLICATIONS

Dead Peer Detection—Technical Product Description; Ericsson AB; 2014-2015; 15 pages.

3GPP TSG-CT WG1 Meeting #91, C1-151315; Bratislava, Slovakia: Apr. 13-17, 2015; 7 pages.

ZTE Merged proposal for IP flow mobility solutions for S2b (GTP); UE-initiated and Network-initiated IP flow mobility 3GPP SA WG2 Meeting #107, S2-150536; Jan. 30, 2015; pp. 7 and 8.

V. Tzvetkov: "Optimization of update intervals in Dead-Peer-Detection using adaptive Fuzzy Logic"; 21st. International Conference on Advanced Networking and Applications (AINA'07); IEEE 2007; 8 pages.

ETSI TS 123 402 V8.10.0 (Mar. 2012): Universal Mobile Telecommunications System (UMTS); LTE; Architecture enhancements for non-3GPP accesses (3GPP TS 23.402 version 8.10.0 Release 8); Mar. 2012; 201 pages.

ETSI TS 129 274 V8.11.0 (Jan. 2012): Universal Mobile Telecommunications System (UMTS); LTE; 3GPP Evolved Packet System (EPS); Evolved General Packet Radio Service (GPRS) Tunneling Protocol for Control plane (GTPv2-C); Stage 3 (3GPP TS 29.274 version 8.11.0 Release 8); Jan. 2012; 150 pages.

International Search Report for PCT/CN2015/077646, dated Feb. 4, 2016; 4 pages.

CISCO: ePDG Administration Guide, StarOS, Release 16, last updated: Jul. 31, 2014; 100 pages.

* cited by examiner

Figure 3 (method in ePDG)

ADAPTIVE PEER STATUS CHECK OVER WIRELESS LOCAL AREA NETWORKS

TECHNICAL FIELD

This disclosure relates generally to detecting of unreachable Internet Key Exchange, IKE, peers.

BACKGROUND

Since the advent of Mobile internet technologies, the users and their demand for the data access with high rate has been growing exponentially. The radio access technologies have evolved to support broadband accesses and the packet core network has evolved to cope with the packet data demands and the evolved radio access technologies. Long Term Evolution, LTE, specified by the third Generation Partnership Project, 3GPP is a broadband cellular IP access technology that provides increased speed and capacity. The 3GPP-specified Evolved Packet Core, EPC, is the packet core network specified for LTE access. Additionally, the EPC is becoming a common core network for packet switched services for 2G and 3G radio access networks as well as Wi-Fi local access network, WLAN, as specified in 3GPP technical specifications TS 23.401 and TS 23.402.

The EPC consists of a packet core domain and a user domain. The user domain provides the complete updated information of users on request. It maintains the database to support roaming mobility of the subscriber as well authentication, authorization and accounting. The user domain consists of multiple nodes comprising HSS, AAA and policy server. The packet core domain provides IP services over 2G (GSM), 3G (WCDMA/HSPA/CDMA), 4G (LTE) and Non-3GPP technologies such as Wi-Fi or Wimax.

To provide packet services to UEs attached through the LTE radio access network, the packet core domain uses the Mobility Management Equipment, MME, the Serving Gateway, SGW, and the Packet Data Network Gateway, PDN GW. The PDN GW is the demarcation point between the IP networks and the packet core domain and acts as the common anchor point for the PDN connections of UEs connecting or moving from one access network to a different access network while maintaining the same IP address.

Using LTE access technology, a UE attaches to the EPC to establish the first PDN connection. A PDN connection is characterized by a PDN type which indicates the type of connectivity requested for the PDN, i.e., Internet Protocol, IPv4, IPv6 or IPv4/IPv6 and an Access Point Name, APN. A default APN is used by the EPC when the UE does not signal the APN in the attach message, else the UE signals the APN in the attach message indicating the PDN it wants to connect to. One Evolved Packet System, EPS, bearer is established when the UE connects to a PDN, and that remains established throughout the lifetime of the PDN connection to provide the UE with always-on IP connectivity to that PDN. That EPS bearer is referred to as the default bearer and is assigned quality of service, QoS, parameters by the network, based on subscription data. The UE may establish additional EPS bearers for the same PDN connection if the applications in the UE require QoS that cannot be offered by the default bearer. The additional EPS bearers are known as dedicated bearers and consume radio resources; hence they are established on a need basis and released when the application no longer needs them.

In an EPC where GPRS tunneling protocol, GTP, is used, an EPS bearer consists of a GTP tunnel established between the PDN GW and the SGW, an S1 bearer between the SGW and the eNodeB, eNB, and a radio bearer between the eNB and the UE. If Proxy Mobile IP is used, the bearer is established between the UE and the gateway associated to the access network technology, i.e., SGW for LTE, HSGW for CDMA, etc.

The UE may establish multiple PDN connection with different APN or the same APN. Each PDN connection consists of a default EPS bearer and zero or more dedicated bearers.

For Voice over LTE, VoLTE, application using IP multimedia service, IMS, the IMS client application in the UE must use for the IMS signalling, the pre-configured IMS well-known APN as defined in GSMA PRD IR.88 "LTE Roaming guidelines", when it attaches to the network or when it establishes an additional PDN connection. If the PDN connection established during the initial attach is to an APN other than the IMS well-known APN, then the UE must establish another PDN connection to the IMS well-known APN in order to register for VoLTE service with IMS. A default EPS bearer is created when the UE establishes the PDN connection to the IMS well-known APN. The default EPS bearer is used for IMS Session Initiation Protocol signaling used for VoLTE. The default EPS bearer is hence used to exchange SIP signaling with a terminating end point to establish a voice path between the UE and the terminating end point. Utilizing interaction of PDN GW with dynamic Policy Control and Charging server in the EPC, a dedicated EPS bearer between the PDN GW in the EPC and the UE is established to transport the conversational voice packets.

As EPC supports multiple radio access networks, a UE can connect to the EPC over an untrusted WLAN. In this scenario, the EPC network does not trust the WLAN which is typically the case when the UE connects to its EPC services through a public Wi-Fi hotspot or through a Wi-Fi hotspot that is not owned by the EPC operator. The packet core domain of the EPC includes an evolved Packet Data Gateway, ePDG, which is used as a gateway to the EPC and is responsible for establishing a secure packet data connection over the untrusted WLAN through the packet core domain to the PDN GW as described in 3GPP TS 23.402. The secure packet data connection consists of an IP security, IPsec, tunnel between the UE and the ePDG, also known as the SWu interface and the GPRS tunneling protocol, GTP, tunnel between the ePDG and the PDN GW, also known as the S2b interface.

In the SWu interface between the UE and the ePDG, the IPSec protocols comprising Internet Key Exchange version 2, IKEv2, Internet Engineering Task Force, IETF, RFC 5996 and IP Encapsulating Security Payload, ESP, IETF RFC 4303, of IPSec, IETF RFC 4301 are used. The IKEv2 protocol originally was designed by IETF to dynamically negotiate keys for IPSec tunnel. However, in the SWu interface, the IKEv2 protocol is specified by 3GPP to implement UE attach and PDN connection procedures. When IKEv2 initial exchanges (including IKE_SA_WIT and IKE_AUTH) are successfully setup, the UE attach procedure and PDN connection establishment is completed: the IPsec tunnel between ePDG and UE and the corresponding GTP tunnel, s2b, between the ePDG and the PDN GW are setup. The IKE_SA_INIT exchange is used to setup IKE_SA including IKE SPI assignment. The IKE_AUTH exchange is used for profile provisioning and user authentication, negotiation of IPSec Security Association, SA, including IPSec SPI assignment associated to an IPSec tunnel, and IP address assignment for the UE. Once the IKE_AUTH exchange is completed, the PDN connection is setup with the corresponding IPSec tunnel as the user plane tunnel over the SWu interface. To release the PDN connection, an IKEv2 INFORMATIONAL exchange is used to delete the IKE_SA and the IPsec SA. When a dedicated bearer is required, a dedicated GTP tunnel (i.e., S2b bearer) is established over the S2b interface which may be a result of interaction between the PDN GW and the Policy control and charging rule server in EPC. The PDN GW sends uplink packet filters to the ePDG as part of the dedicated GTP tunnel establishment procedure. The ePDG links the dedicated bearer to the default bearer and uses the uplink packet filter to determine the mapping of uplink traffic flows from the UE to the GTP tunnel. The IPsec tunnel between the ePDG aggregates IMS SIP signaling and the voice packets and connects to the default and dedicated GTP tunnels.

A UE may also request Voice over LTE service when connected to an untrusted WLAN access. The service is known as VoWi-Fi. The UE uses the same IMS client application and supports mobility between LTE and Wi-Fi networks, hence enabling seamless handover of a voice call when the user moves between the two access networks. To support VoWi-Fi, a PDN connection is established using the IMS well-known APN resulting in establishment of an IKE SA, an IPsec tunnel and a GTP tunnel as a default s2b bearer. Once the VoWi-Fi session is negotiated to establish a voice path, a dedicated GTP tunnel to carry the voice packets is established between the ePDG and the PDN GW. One IPSEC tunnel connects to the two GTP tunnels (default and dedicated).

During a VoWi-Fi session, UE may go out of the Wi-Fi coverage area or loses connection due to WLAN network issues. In these cases, IKE keep-alive mechanism can be used to detect whether the remote peer is still there, to perform IKE peer failover, and to reclaim unused resources. An alternative method called Dead Peer Detection, DPD, as specified in IETF RFC 3706 "A Traffic-Based Method of Detecting Dead Internet Key Exchange (IKE) Peers" can also be used to detect unreachable Internet Key Exchange (IKE) peers. Each peer (UE and ePDG) may have different requirements for detecting proof of liveliness. The purpose of DPD is to potentially kill the SAs or may force renegotiation of the SAs when a dead peer is detected. Unlike IKE keep-alive method, each peer can govern the DPD message exchange, for example when one peer (e.g., ePDG) is about to send IPsec packets to the other peer (e.g., UE) after a period of idleness, it starts the DPD exchange to detect if the other peer is still alive, or each peer can define its own DPD exchange interval that defines the urgency of the DPD exchange from each peers' perspective.

Real-time communication scenarios (e.g., VoWi-Fi) need frequent detection, which is not required in best effort scenario, but frequent detection would increase the signaling load. In current standard practice, reducing the network load and increasing the network efficiency do not balance quite well.

SUMMARY

The following acronyms are used throughout this disclosure.
3GPP 3rd Generation Partnership Project
APN Access Point Name
DPD Dead-Peer-Detection
ePDG evolved Packet Data Gateway
EPC Evolved Packet Core
GTP GPRS Tunneling Protocol
HSS Home Subscriber Server
IKE Internal Key Exchange
IPSec IP Security
LTE Long term evolution
PDN Packet Data Network
SA Security Association
S2b The interface between ePDG and P-GW
SeGW Security Gateway
SPI Security Parameter Index
SWm The interface between ePDG and 3GPP AAA server
SWu The interface between UE and ePDG
UE User Equipment It is an object of the present invention to obviate or mitigate at least one disadvantage of the prior art to enable an ePDG to use a default peer status time interval for checking the IKE peer liveliness at the UE following establishment of a PDN connection comprising an IPsec tunnel and a default GTP tunnel. Upon establishment of one or more dedicated GTP tunnels in support of a multimedia service such as voice over Wi-Fi service, the ePDG uses a dedicated peer status time interval T2 different from the default peer status time interval T1 for checking the IKE peer liveliness at the UE. The default and dedicated peer status time intervals T1 and T2 may be two pre-configured values or different values may be configured for different quality of service, QoS, class identifier, QCI specified in 3GPP RS 23.203 and associated with a GTP tunnel. The ePDG then selects the timer value based on the QCI and type of the GTP tunnel (i.e., default, or dedicated and non-guaranteed bit rate resource type, Non-GBR or GBR resource type).

According to an embodiment, an evolved Packet data gateway, ePDG, establishes a packet data network, PDN, connection that comprises an Internet Protocol Security, IPsec, tunnel established with peer user equipment, UE, and a corresponding default General Packet Radio Service, GPRS tunnel established with a packet data gateway. The ePDG uses a first peer status time interval T1 to detect liveliness of the peer UE, and upon establishment of a dedicated GTP tunnel for the PDN connection, the ePDG uses a second peer status time interval T2, different than T1 to detect liveliness of the peer UE until the dedicated GTP tunnel is deactivated.

In one embodiment, the first peer status time interval T1 and the second peer status time interval T2 are pre-configured at the ePDG and in another embodiment the second peer status time interval T2 is less than the first peer status time interval T2.

According to an embodiment, the ePDG sends at every first peer status time interval T1 a peer status message to the peer UE to verify peer UE liveliness. If the ePDG fails to receive an acknowledgement to the peer status message from the peer UE, it sends a second peer status message after the first peer status time interval T1 expires and if the ePDG fails to receive an acknowledgement to the second peer status message, it sends a third peer status message to the peer UE after a first fraction of the first peer status interval timer T1 expires. If again the ePDG fails to receive an acknowledgement to the third peer status message, it sends a fourth peer status message to the peer UE after a second fraction of the first peer status interval timer T1 expires wherein the second fraction is smaller than the first fraction.

In another embodiment, the ePDG determines the peer UE is unresponsive after sending at least three subsequent peer status messages to the UE. In another embodiment, the ePDG uses the second peer status time interval T2 to detect liveliness of the peer UE further comprises sending at every second peer status time interval T2 a peer status message to the peer UE to verify peer UE liveliness. The ePDG may determine the peer UE is unresponsive after sending at least three subsequent peer status messages to the peer UE.

According to another embodiment, the ePDG reverts to using the first peer status time interval T1 to detect liveliness of the peer UE after releasing the dedicated GTP tunnel(s), and maintaining the default GTP tunnel in the PDN connection.

According to another embodiment the ePDG further determines the first peer status time interval T1 and/or the second peer status time interval T2 using quality of service parameters such as QCI and or guaranteed bit rate associated with the established GTP tunnels.

BRIEF DESCRIPTION OF THE DRAWINGS

Embodiments of the present invention will now be described, by way of example only, with reference to the attached Figures, wherein.

DETAILED DESCRIPTION

The various features of the invention will now be described with reference to the figures. These various aspects are described hereafter in greater detail in connection with exemplary embodiments and examples to facilitate an understanding of the invention, but should not be construed as limited to these embodiments. Rather, these embodiments are provided so that the disclosure will be thorough and complete, and will fully convey the scope of the invention to those skilled in the art.

Many aspects of the invention are described in terms of sequences of actions or functions to be performed by elements of a computer system or other hardware capable of executing programmed instructions. It will be recognized that the various actions could be performed by specialized circuits, by program instructions being executed by one or more processors, or by a combination of both. Moreover, the invention can additionally be considered to be embodied entirely within any form of computer readable carrier or carrier wave containing an appropriate set of computer instructions that would cause a processor to carry out the techniques described herein.

Figure 1:
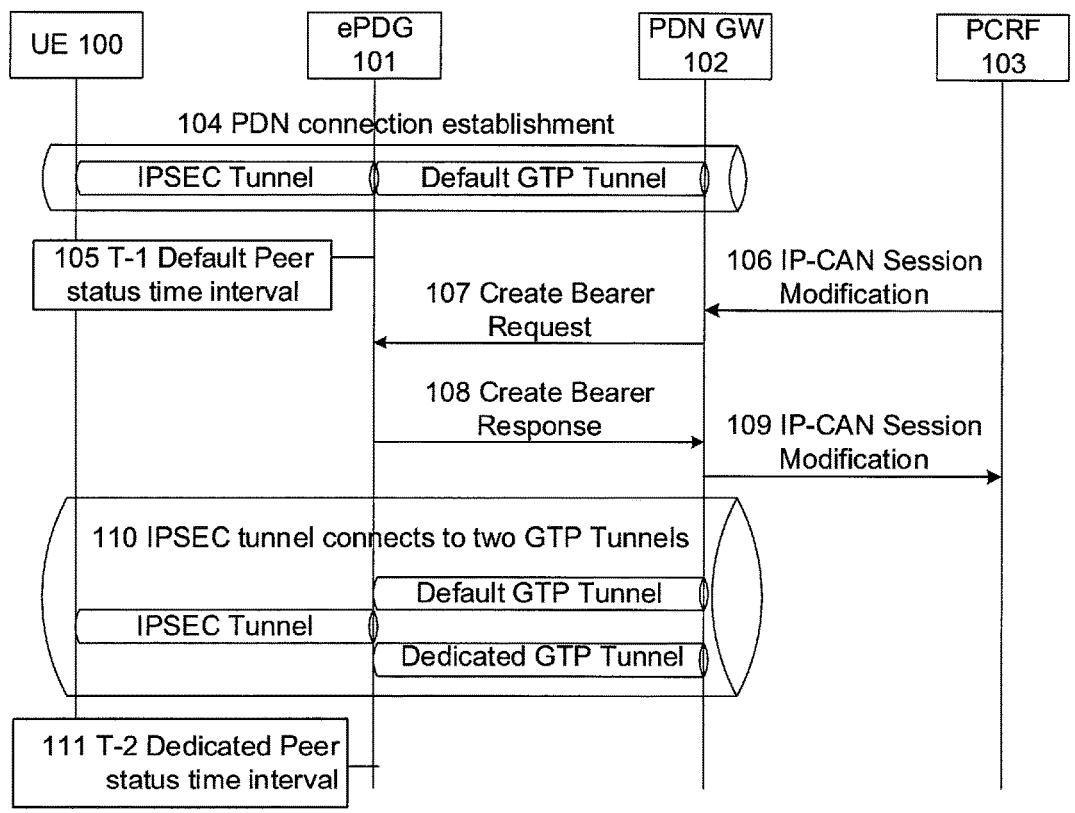
FIG. 1 illustrates a sequence diagram of an ePDG adapting the peer status time interval when multimedia session is established according to an embodiment.

FIG. 1 is a sequence diagram illustrating a sequence diagram of an ePDG 101 adapting the peer status time interval when multimedia session is established according to an embodiment. An example of a multimedia session is a voice over Wi-Fi session but other multimedia session such as conversational video session may also be used. At step 104, the UE 100 establishes the PDN connection that comprises a concatenation of an IPsec tunnel established between the UE 100 and the ePDG 101 and a corresponding default GTP tunnel established between the ePDG 101 and the PDN GW 102. The default GTP tunnel over which the UE is assigned an IP address for the PDN, corresponds to the default bearer established at the time the UE 100 is attaching to the network or the UE 100 requesting establishment of an additional PDN connection. The default GTP tunnel is an always-ON tunnel and is maintained for as long as the UE 100 remains connected to the PDN. The PDN connection is established using a default APN or the IMS well-known APN, in which case the default GTP tunnel is used for the SIP signaling exchange required to establish a VoWi-Fi session.

Figure 4:
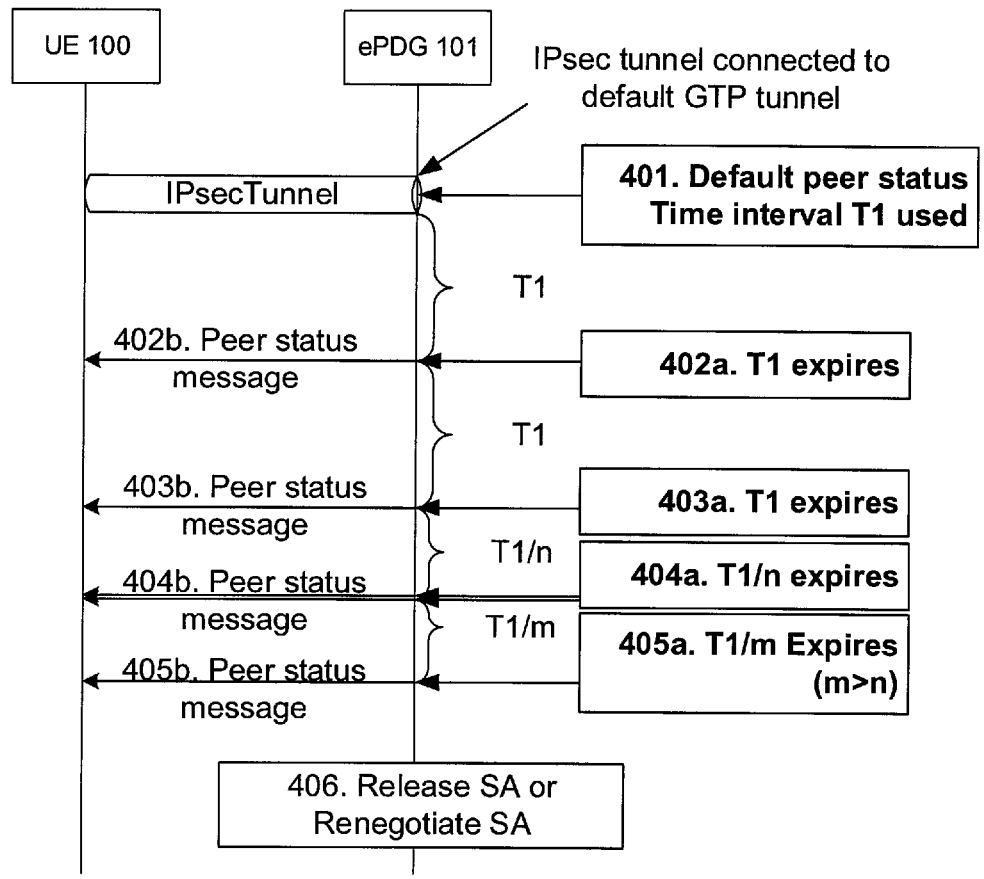
FIG. 4 illustrates a sequence diagram of a peer status exchange according to an embodiment.

At step 105, the ePDG 101 determines that the default GTP tunnel is established for the IPsec tunnel, and no other dedicated GTP tunnels are established for the PDN connection. Consequently, the ePDG 101 determines that peer status is to be checked at regular default peer status time interval T1. The ePDG 101 starts checking the peer status at expiration of T1 to verify if the IKE SAs are still alive and valid at the UE. An embodiment of the peer status check procedure is shown in FIG. 4. At step 106, it is assumed that dynamic policy control and charging rule, PCC, framework as specified in 3GPP TS 23.203, is used where a PCRF 103 sends an IP-CAN session modification message to the PDN GW 102 which may be a result of the VoWi-Fi signaling session negotiation of the media resources over the default GTP tunnel. The IP-CAN session modification sent from the PCRF 103 comprises uplink and downlink packet filters and the quality of service, QoS, parameters required for the media session(s). The QoS parameters comprise the Allocation and Retention Priority, ARP, a QoS class identifier, QCI, the guaranteed and the maximum bit rate, GBR and MBR respectively as specified in 3GPP TS 23.203. For a VoWi-Fi service, the QCI transmitted for the dedicated GTP tunnel would be typically set to one (1) indicating conversational voice. At step 107, the PDN GW 102 uses the QoS policy received from the PCRF 103 to determine if a dedicated GTP tunnel for a dedicated bearer should be established if the received QoS parameters at step 106 do not map to the QoS parameters of the existing default bearer, i.e., default GTP tunnel. If the PDN GW 102 determines that it should setup a dedicated bearer it assigns the received QoS parameters to the bearer level QoS parameters QCI, ARP, GBR and MBR and sends a Create Bearer Request message to ePDG 101 to establish a dedicated bearer with the associated dedicated GTP tunnel. The Create Bearer Request message comprises the QoS parameters, the uplink and downlink packet filters, the UE identity, and the Linked Bearer Identity, LBI, etc., where the LBI is the bearer identity of the default bearer associated to the default GTP tunnel. Alternatively, if dynamic PCC is not used, the PDN GW 102 may apply local QoS policy to trigger a dedicated GTP tunnel establishment for a dedicated bearer with the ePDG 101.

In this disclosure, as bearers and the GTP tunnels are established between the ePDG 101 and the PDN GW 102, GTP tunnel will be used from here in to mean bearer and GTP tunnel.

At step 108, the ePDG 101 selects and stores a Bearer Identity for the dedicated GTP tunnel and uses the received LBI in step 107 to link the dedicated GTP tunnel to the default GTP tunnel established at step 104. The ePDG 101 uses the uplink packet filters received at step 107 for mapping the uplink traffic flows received over the IPsec tunnel from the UE 100 to the corresponding GTP tunnel. At step 108, the ePDG 101 proceeds to send a Create Bearer Response to the PDN GW 102, comprising the assigned Bearer Identity and the ePDG Address for the user plane, etc. FIG. 1 limits the dedicated GTP tunnels to one tunnel as an example, but it is understood that more than one dedicated GTP tunnel can be established if multiple media sessions for the IMS/SIP session (e.g., conversational video, VoWi-Fi with video and/or messaging media or other multimedia services) are negotiated.

At step 109, the PDN GW 102 indicates to the PCRF 103 the result of the requested IP-CAN session modification received at step 106. In the example illustrated in FIG. 1, the result indicates acceptation of enforcement of the QoS parameters for the media session.

Table 1 below shows an example of the pre-configured QCI to peer status time interval. Depending on the QoS requirements of the multimedia service, the requested dedicated GTP tunnel may be of the type guaranteed bit rate, GBR, or of the type non-Guaranteed bit rate, Non-GBR. GBR bearers apply to more stringent applications that require quality of service guarantees. When a dedicated GTP tunnel is of the type Non-GBR, the value of T2 would typically be longer than the value of T2 configured for a dedicated GTP tunnel of the type GBR. The default GTP tunnel is always associated to a QCI of Non-GBR type as illustrated in the example configuration table below.

TABLE 1

Example of configuration of Peer status time interval

| QCI | Resource Type | Configured T2 (sec) | Configured T1 (sec) | Example services |
| --- | --- | --- | --- | --- |
| 1 | GBR | 1 | — | Conversational Voice |
| 2 | | 1 | — | Conversational Video (Live Streaming) |
| 3 | | 1 | — | Real Time Gaming |
| 4 | | 5 | — | Non-Conversational Video (Buffered Streaming) |
| 65 | | 1 | — | Mission Critical user plane Push To Talk voice |
| 66 | | 3 | — | Non-Mission-Critical user plane Push To Talk voice |
| 5 | Non-GBR | 40 | 50 | IMS Signalling |
| 6 | | 50 | 60 | Video (Buffered Streaming) TCP-based (e.g., www, e-mail, chat, ftp, peer-2-peer (P2P) file sharing, progressive video, etc.) |
| 7 | | 15 | 20 | Voice, Video (Live Streaming) Interactive Gaming |
| 8 | | 30 | 40 | Video (Buffered Streaming) |
| 9 | | 30 | 40 | TCP-based (e.g., www, e-mail, chat, ftp, P2P file sharing, progressive video, etc.) |
| 69 | | 10 | 20 | Mission Critical delay sensitive signalling |
| 70 | | 10 | 20 | Mission Critical Data (e.g. example services are the same as QCI 6/8/9) |

At step 110, the default and the dedicated GTP tunnels are established for the PDN connection and the ePDG binds the GTP tunnels to the established IPsec tunnel. The UE 100 is engaged in a conversational Voice where the media packets are transmitted over the IPsec tunnel and the established dedicated GTP tunnel. The ePDG 101 uses the uplink packet filters to map the media packets to the dedicated GTP tunnel. The session signaling messages are transmitted over the IPsec tunnel and the default GTP tunnel.

At step 111, as a result of establishing a dedicated GTP tunnel to transport the media packets of the established multimedia service or VoWi-Fi service, the ePDG 101 sets the peer status time interval to the dedicated peer status time interval T2 which is different than T1, where T1 is the default peer status time interval used for the always-ON default GTP tunnel. The ePDG 101 adapts the peer status time interval to the VoWi-Fi service by verifying the quality of service parameters, notably the QCI associated to the dedicated GTP tunnel. T2 may be pre-configured at the ePDG 101 on a per QCI value. If more than one dedicated GTP tunnel is established for the service with different QCI values, the ePDG 101 may select the smaller of the two. For example, if a multimedia session results in establishing a dedicated bearer for conversational voice having QCI of one (1) and a second dedicated bearer for video having a QCI of two (2) and if different T2 values are configured for the two QCI values, then the ePDG 101 may select the smallest T2 value as the new peer status time interval for checking the peer status.

The ePDG 101 starts T2 and when it expires, the ePDG 101 verifies if the IKE/IPsec SA is still alive and valid at the UE 100. The frequency of the peer status check is higher at T2 compared to when using T1, hence allowing the ePDG 101 to quickly detect a dead peer or an unresponsive UE 100, and maintaining a reliable IPsec connection as required by the multimedia service. A higher frequency peer status check would typically be used when the dedicated GTP tunnel is of type GBR. The faster the ePDG 101 detects UE unresponsiveness condition the quicker it reacts and take further appropriate measures for the service such as renegotiating the IKE/IPsec SA or trigger a failover mechanism or inform the PDN GW 102 which then informs the PCRF 103 which then notifies the application providing the service.

In an alternative embodiment, the PCRF 103 may transmit to the PDN GW 102 the peer status time intervals T1 and T2 as part of the PDN connection establishment procedure, step 104, and IP-CAN session modification procedure, step 106, respectively. The PDN GW 102 then transmits the received T1 during the PDN connection establishment over the S2b interface established at step 104 and transmits T2 to the ePDG 101 in the Create bearer request over the S2b interface at step 107.

Figure 2:
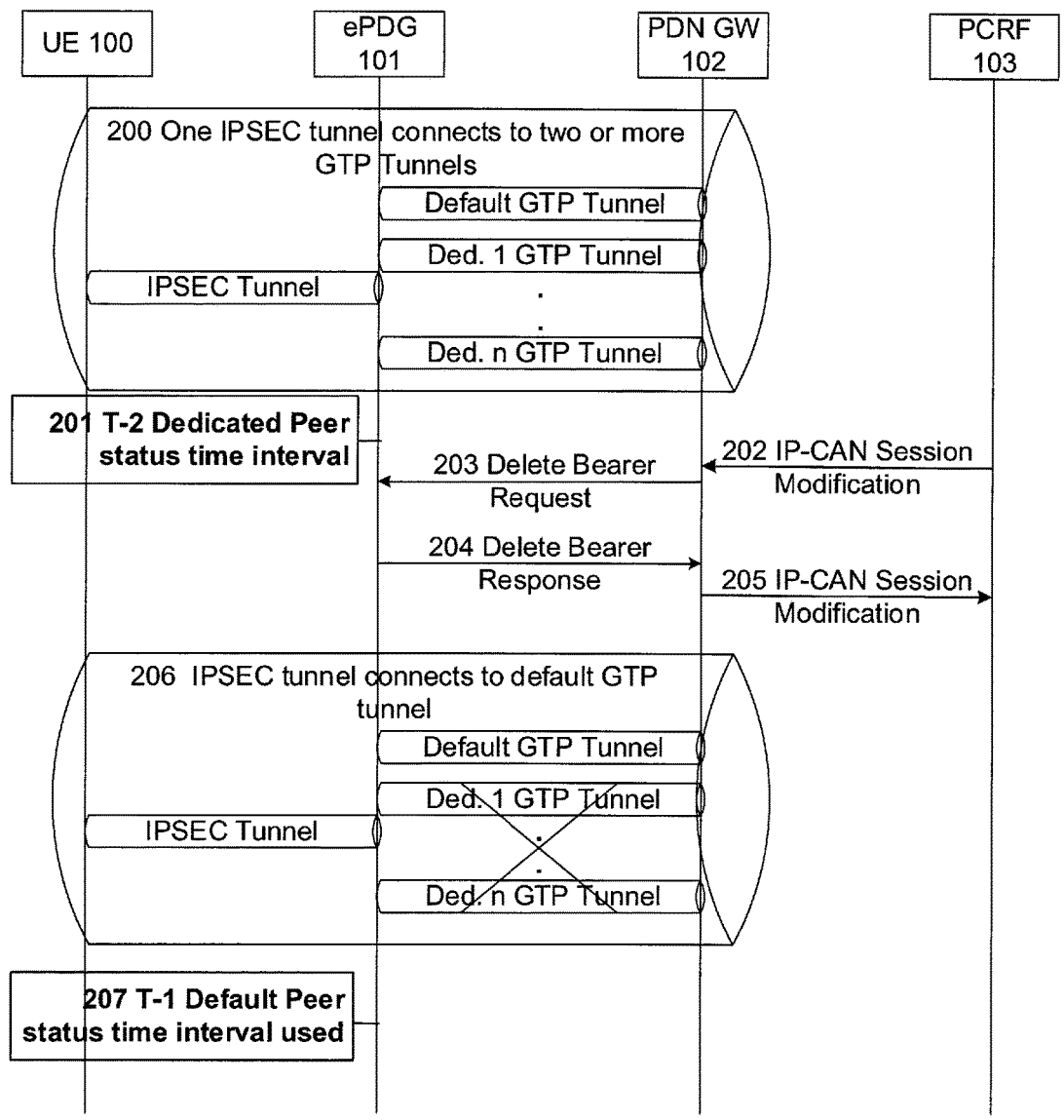
FIG. 2 illustrates a sequence diagram of an ePDG adapting the peer status time interval when the multimedia session is terminated according to another embodiment.

FIG. 2 illustrates a sequence diagram of the ePDG 101 adapting the peer status time interval when the multimedia service is terminated according to another embodiment. The multimedia service, which may be a VoWi-Fi service resulted in the establishment of more than one dedicated GTP tunnels connected to the single IPsec tunnel. At step 200, the PDN connection is established and comprises one default GTP tunnel and one or more dedicated GTP tunnels established to transport the media packets of the multimedia service provided to the UE 100. Since dedicated GTP tunnels are established, ePDG 101 is using T2 for checking the peer status as illustrated at step 201. The ePDG 101 may be using a higher frequency check of the peer status especially if one or more of the dedicated GTP tunnels are of GBR type.

At step 202, if dynamic PCC is deployed, and the multimedia service is completed or terminated, the PCRF 103 sends an IP-CAN Session Modification message to the PDN GW 102 for release of the dedicated GTP tunnels/resources associated to the multimedia service. At step 203, the PDN GW 102 sends a Delete Bearer Request message over the S2b interface comprising the Linked Bearer ID, LBI, to the ePDG 101 for deletion of the dedicated GTP tunnels associated to the multimedia service. The ePDG 101 deletes one or more Bearer Identities as included in the Delete Bearer Request message and at step 204 a Delete Bearer Response message is sent from ePDG 101 to the PDN GW 102 to acknowledge the dedicated GTP tunnel deactivation. At step 205, if the dedicated bearer deactivation procedure was triggered by a PCC IPCAN session modification message from the PCRF 103, the PDN GW 102 indicates to the PCRF 103 the completion of IP CAN bearer signaling and release of the dedicated resources for the multimedia service.

At step 206, all the dedicated GTP tunnels have been deactivated, and the IPsec tunnel remains connected to the default GTP tunnel to maintain the UE 100 connectivity to the PDN. At step 207, the ePDG 101 reverts to using the default peer status time interval T1 to check the peer status at the UE. T1 is set according to the QCI associated to the default GTP tunnel of type Non-GBR. Alternatively, a single value for T1 can be configured for any default GTP tunnel regardless of the associated QCI value.

Alternatively, the ePDG 101 may revert to using T1 that may be received over the S2b interface at the time of PDN connection establishment. In this alternative T1 may have been determined at the PCRF 103 and transmitted to the PDN GW 102, then to the ePDG 101 at the time of PDN connection establishment.

Figure 3:
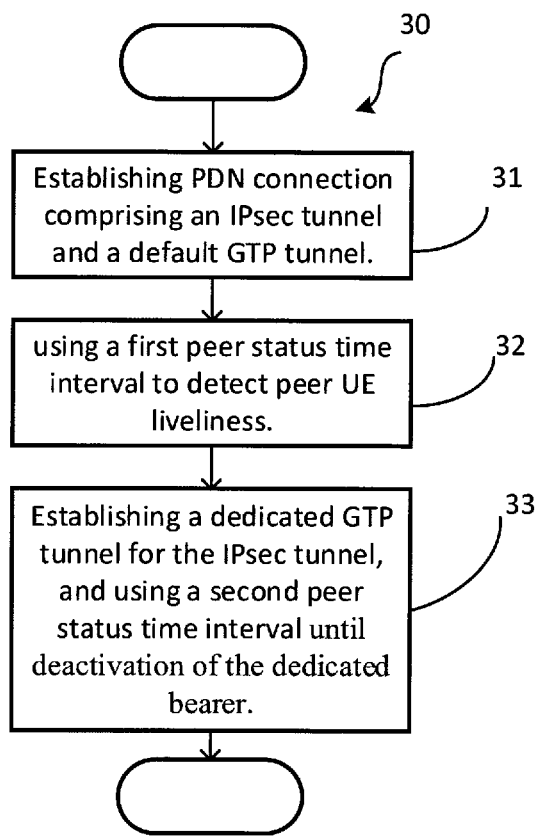
FIG. 3 illustrates a flowchart of a method executed at an ePDG for adapting the peer status time interval when a multimedia session is established, according to an embodiment.

FIG. 3 illustrates a flowchart of a method 30 executed at an ePDG for adapting the peer status time interval when a multimedia session such as VoWi-Fi is established, according to an embodiment. At step 31, the ePDG establishes a PDN connection for a UE requesting access to the evolved packet core, EPC. To establish the PDN connection, the UE is authenticated using IKE or IKE version 2 through the ePDG triggering a default GTP tunnel to be established between the ePDG and the PDN GW. The default GTP tunnel corresponds to the default bearer established at the time of UE attaching to the network or the UE requesting establishment of an additional PDN connection, over which the UE is assigned an IP address to access the PDN. The default GTP tunnel is an always-ON tunnel and is maintained for as long as the UE remains connected to the PDN. The PDN connection is established using a default APN or the IMS well-known APN, in which case the default GTP tunnel is used for the SIP signaling exchange required to establish a VoWi-Fi session.

At step 32, once the PDN connection is established comprising the default GTP tunnel of type Non-GBR, the ePDG determines that peer status is to be checked at regular default peer status time interval T1. The ePDG 101 starts checking the peer status at expiration of T1 to verify if the IKE SAs are still alive and valid at the UE. An embodiment of the peer status check procedure is shown in FIG. 4. The ePDG sets T1 according to the QCI associated to the default GTP tunnel of type Non-GBR. Alternatively, a single value for T1 can be configured for any default GTP tunnel regardless of the associated QCI value. Alternatively, the ePDG may use T1 that may be received over the S2b interface at the time of PDN connection establishment. In this alternative T1 may have been determined at the PCRF and transmitted to the PDN GW which then transmits T1 to the ePDG as part of the PDN connection establishment procedure.

At step 33, when the UE request a multimedia service after establishing the PDN connection, or at the time of establishing the PDN connection, the ePDG receives a request from the PDN GW to establish one or more dedicated GTP tunnels as required by the multimedia service. The ePDG sets the peer status time interval to the dedicated peer status time interval T2, where T2 could be shorter than T1, T1 being the default peer status time interval used for the always-ON default GTP tunnel. The ePDG uses T2 to check the peer status instead of T1 for as long as the dedicated GTP tunnels are established in other words for as long as UE uses the multimedia service. The ePDG selects or uses a peer status time interval to adapt to the multimedia service using the quality of service parameters (e.g., QCI, GBR) signaled with the request for establishing the dedicated GTP tunnel (s). T2 may be pre-configured at the ePDG on a per QCI value. If more than one dedicated GTP tunnel is established for the multimedia service with different QCI values, the ePDG may select the smallest configured T2. For example, if a multimedia session results in establishing a dedicated bearer for conversational voice having QCI of one (1) and a second dedicated bearer for video having a QCI of three (3) and if different T2 values are configured for the two QCI values, then ePDG may select the smallest of the two and use it as the new peer status time interval to check the peer status. A dedicated GTP tunnel may be associated to a guaranteed bit rate, GBR, bearer or a non-Guaranteed bit rate, Non-GBR bearer depending on the QoS requirements of the multimedia service. GBR bearers apply to more real time services that require guaranteed bit rate connection. When a dedicated GTP tunnel of type Non-GBR is requested, the value of T2 would typically be longer than the value of T2 configured for a dedicated GTP tunnel of type GBR.

FIG. 4 illustrates an embodiment of a peer status check procedure using T1 default peer status time interval, i.e., prior to establishment of a multimedia service necessitating establishment of dedicated GTP tunnels. At step 401, the ePDG sets the peer status time interval to T1 following establishment of the PDN connection with a default GTP tunnel. At step 402a T1 expires, the ePDG 101 transmits a peer status check message to the UE 100, where the peer status check message which may be a hello message or an IKE Informational Request message is used for querying if the IKE/IPsec SA is dead or alive at the UE, step 402b. The ePDG 101 starts T1 again either immediately after sending the peer status check message or after expiry of another response timer set to wait for a response for a peer status check message. The ePDG 101 fails to receive a response to the first peer status check message sent at step 402b. At step 403a, T1 expires again at the ePDG 101 and sends at step 403b another peer status check message to the UE 100. As no response is received from the UE 100, the ePDG 101 at step 404a waits T1/n, a shorter time interval before sending at step 404b another peer status check message to the UE. Failing to receive a response, the ePDG 101 at step 405a waits T1/m where m>n to send at step 405b a final peer status check message to the UE 100. The retransmit peer status interval will decrease each time the ePDG 101 fails to receive a response from the UE 100. Finally the ePDG 101 may take different measures after T1+T1/n+T1/m has lapsed, notifying the PDN GW to further notify the PCRF, release the IKE/IPsec session or in some cases may start renegotiating the IKE SA. It is understood that the sequence diagram in FIG. 4 is cited as an example and variations in terms of the number of peer status check messages sent to the UE 100 may vary.

In another embodiment, when T2 is used as a peer status time interval, the ePDG 101 may use the same escalated method as proposed in FIG. 4 when it fails to receive a response to the peer status check message. Alternatively, the ePDG 101 may send n number of peer status check message to the UE 100 at T2 interval, where n=2 or 3 prior to determining that the UE is unresponsive and determining that different measures can be taken including but not limited to notifying the PDN GW to further notify the PCRF which further notifies the application server, releasing the IKE/IPsec session or in some cases may start renegotiating the IKE SA.

Figure 5:
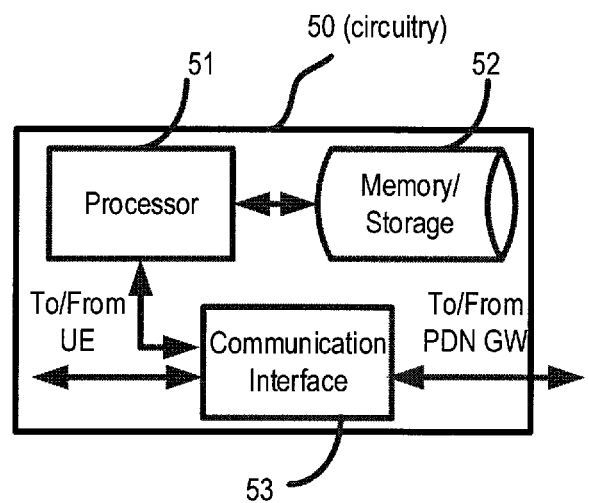
FIG. 5 is a schematic illustration of an ePDG according to an embodiment.

In one embodiment illustrated in FIG. 5, an ePDG comprises a circuitry 50 which executes the method steps according to the embodiments as described in FIG. 3, along with steps 104-105, 107-108, 110-111 of FIG. 1 and steps 200-201, 203-204 and 206-207 of FIG. 2 and all steps in FIG. 4 in addition to other embodiments described herein. In one embodiment, the circuitry 50 may comprise a processor 51 and a storage 52 (also referred to as memory) containing instructions, which when executed, cause the processor 51 to perform the steps in a method according to embodiments described herein. The circuitry 50 may further comprise a communication interface 53 to communicate with external entities such as with UE devices using IKE and IPsec tunnels and with PDN GWs using GTP.

Figure 6:
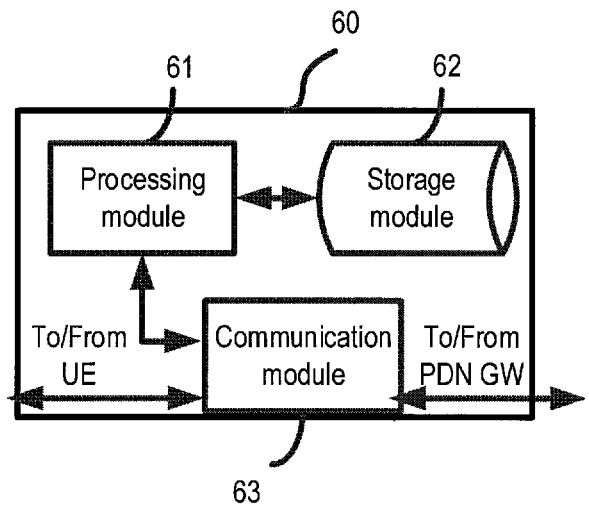
FIG. 6 is a schematic illustration of an ePDG according to another embodiment.

FIG. 6 illustrates an exemplary embodiment of an ePDG comprising a processing module 61 configured to establish a PDN connection comprising an IPsec tunnel and a corresponding default GTP tunnel through a communication module 63, use T1 stored in a storage module 62 to detect liveliness of the peer UE and upon establishment of a dedicated GTP tunnel for the PDN connection over the communication module 63, use T2 stored in the storage module 62, which is different than T1 to detect liveliness of the peer UE where T2 is used for as long as the dedicated GTP tunnel is established. The communicating module 63 is configured to send peer status check messages to detect peer UE liveliness in addition to sending and receiving signaling messages for establishing the PDN connection and the dedicated GTP tunnels as well as sending and receiving media packets. The circuitry 60 further comprises the storage module configured to maintain T1 and T2.

A person skilled in the art would understand that the modules can be implemented as a computer program running on a processor and that the modules are operative to execute the steps of the previously described method.

The invention has been described with reference to particular embodiments. However, it will be readily apparent to those skilled in the art that it is possible to embody the invention in specific forms other than those of the embodiments described above. The described embodiments are merely illustrative and should not be considered restrictive in any way. The scope of the invention is given by the appended claims, rather than the preceding description, and all variations and equivalents that fall within the range of the claims are intended to be embraced therein.

What is claimed is:

1. A method in an evolved Packet data gateway, ePDG, for determining peer status check interval for a peer User Equipment, UE, the method comprising:
    establishing a packet data network, PDN, connection comprising a concatenation of an Internet Protocol Security, IPsec, tunnel established with the peer UE, and a corresponding default General Packet Radio Service, GPRS tunneling Protocol, GTP, tunnel established with a packet data gateway;
    using a first peer status time interval in accordance with the default GTP tunnel to detect liveliness of the peer UE over the IPSec, tunnel; and
    upon establishment of a dedicated GTP tunnel with the packet data gateway for the PDN connection, using a second peer status time interval in accordance with the dedicated GTP tunnel to detect liveliness of the peer UE over the IPSec tunnel until deactivation of the dedicated GTP tunnel, the second peer status time interval being different from the first peer status time interval.

2. The method of claim 1, wherein the first peer status time interval and the second peer status time interval are pre-configured.

3. The method of claim 1, wherein the second peer status time interval is less than the first peer status time interval.

4. The method of claim 1, wherein using the first peer status time interval to detect liveliness of the peer UE further comprises sending at every first peer status time interval a peer status message to the peer UE to verify peer UE liveliness.

5. The method of claim 4, wherein if the ePDG fails to receive an acknowledgement to the peer status message from the peer UE, sending a second peer status message after the first peer status time interval expires.

6. The method of claim 5, wherein if the ePDG fails to receive an acknowledgement to the second peer status message, sending a third peer status message to the peer UE after a first fraction of the first peer status interval timer expires.

7. The method of claim 6, wherein if the ePDG fails to receive an acknowledgement to the third peer status message, sending a fourth peer status message to the peer UE after a second fraction of the first peer status interval timer expires wherein the second fraction is smaller than the first fraction.

8. The method of claim 4, wherein the method further comprises determining the peer UE is unresponsive after sending at least three subsequent peer status messages to the UE.

9. The method of claim 1, wherein using the second peer status time interval to detect liveliness of the peer UE further comprises sending at every second peer status time interval a peer status message to the peer UE to verify peer UE liveliness.

10. The method of claim 9, wherein the method further comprises determining the peer UE is unresponsive after sending at least three subsequent peer status messages to the peer UE.

11. The method of claim 1 further comprising:
    upon releasing the dedicated GTP tunnel while maintaining the default GTP tunnel established for the PDN connection, reverting to using the first peer status time interval to detect liveliness of the peer UE over the IPSec tunnel.

12. The method of claim 1, wherein the method further comprises determining at least one of the first peer status time interval and the second peer status time interval using quality of service, QoS, parameters associated with corresponding established GTP tunnels.

13. The method of claim 12, wherein the QoS parameters comprise at least one of QoS class identifier, QCI, and guaranteed bit rate, GBR.

14. An evolved packet data gateway ePDG, configured to determine peer status check interval for a peer User Equipment, UE, the ePDG comprising a circuitry configured to:
   establish a packet data network, PDN, connection comprising a concatenation of an Internet Protocol Security, IPsec, tunnel established with the peer UE and a corresponding default General Packet Radio Service, GPRS tunneling Protocol, GTP, tunnel established with a packet data gateway;
   using a first peer status time interval in accordance with the default GTP tunnel to detect liveliness of the peer UE over the IPSec, tunnel; and
   upon establishment of a dedicated GTP tunnel with the packet data gateway for the PDN connection, using a second peer status time interval in accordance with the dedicated GTP tunnel to detect liveliness of the peer UE over the IPSec tunnel until deactivation of the dedicated GTP tunnel, the second peer status time interval being different from the first peer status time interval.

15. The ePDG of claim 14, wherein the circuitry comprises a processor, a communication interface and a memory, the memory containing instructions executable by the processor.

16. The ePDG of claim 14, wherein the second peer status time interval is less than the first peer status time interval.

17. The ePDG of claim 14, wherein the circuitry is further configured to
   upon release of the dedicated GTP tunnel, while maintaining the default GTP tunnel established for the PDN connection, revert to using the first peer status time interval to detect liveliness of the peer UE over the IPsec tunnel.

18. The ePDG of claim 14, wherein the circuitry is further configured to determine at least one of the first peer status time interval and the second peer status time interval using quality of service, QoS, parameters associated with corresponding established GTP tunnels.

19. The ePDG of claim 18, wherein the QoS parameters comprise at least one of QoS class identifier, QCI, and guaranteed bit rate, GBR.

* * * * *